United States Patent
Hsieh (10) Patent No.: US 12,549,287 B2
(45) Date of Patent: Feb. 10, 2026

(54) METHOD AND APPARATUS FOR DETERMINATION OF TYPE-1 HARQ-ACK CODEBOOK IN PUCCH FOR SCELL DORMANCY

(71) Applicant: MediaTek Inc., Hsinchu (TW)

(72) Inventor: Chi-Hsuan Hsieh, Hsinchu (TW)

(73) Assignee: MediaTek Inc. (TW)

( * ) Notice: Subject to any disclaimer, the term of this patent is extended or adjusted under 35 U.S.C. 154(b) by 320 days.

(21) Appl. No.: 18/216,082

(22) Filed: Jun. 29, 2023

(65) Prior Publication Data

US 2024/0048278 A1    Feb. 8, 2024

Related U.S. Application Data

(60) Provisional application No. 63/370,681, filed on Aug. 8, 2022.

(51) Int. Cl.
*H04L 1/1607* (2023.01)
*H04W 72/20* (2023.01)

(52) U.S. Cl.
CPC .......... *H04L 1/1671* (2013.01); *H04W 72/20* (2023.01)

(58) Field of Classification Search
None
See application file for complete search history.

(56) References Cited

U.S. PATENT DOCUMENTS

| | | | |
|---|---|---|---|
| 2020/0313833 A1* | 10/2020 | Yi | H04L 5/001 |
| 2021/0203468 A1* | 7/2021 | Yi | H04W 72/0453 |
| 2022/0030659 A1 | 1/2022 | Kim | |
| 2022/0201726 A1* | 6/2022 | Papasakellariou | H04W 72/1273 |
| 2022/0225139 A1* | 7/2022 | Seo | H04L 5/001 |
| 2023/0129120 A1* | 4/2023 | MolavianJazi | H04L 1/1887 370/329 |
| 2024/0032062 A1* | 1/2024 | MolavianJazi | H04W 72/1268 |
| 2024/0260048 A1* | 8/2024 | Park | H04L 1/1812 |

FOREIGN PATENT DOCUMENTS

CN    113543215 A    10/2021

OTHER PUBLICATIONS

European Patent Office, Extended European Search Report in European Patent Application No. 23190100.0, Dec. 8, 2023.

* cited by examiner

*Primary Examiner* — Steve R Young
(74) *Attorney, Agent, or Firm* — Andy M. Han; Han IP PLLC (57) ABSTRACT

Various solutions for determination of type-1 hybrid automatic repeat request-acknowledgement (HARQ-ACK) codebook in physical uplink control channel (PUCCH) for secondary cell (SCell) dormancy are described. An apparatus may determine that an active downlink (DL) bandwidth part (BWP) for a serving cell of the apparatus is a dormant BWP. The apparatus may determine K1 values associated with an active uplink (UL) BWP for the serving cell according to a set of slot timing values including integer multiples of 1. Accordingly, the apparatus may apply the K1 values for determination of a type-1 HARQ-ACK codebook in a PUCCH.

9 Claims, 5 Drawing Sheets

METHOD AND APPARATUS FOR DETERMINATION OF TYPE-1 HARQ-ACK CODEBOOK IN PUCCH FOR SCELL DORMANCY

CROSS REFERENCE TO RELATED PATENT APPLICATION(S)

The present disclosure is part of a non-provisional application claiming the priority benefit of U.S. Patent Application No. 63/370,681, filed 8 Aug. 2022, the content of which herein being incorporated by reference in its entirety.

TECHNICAL FIELD

The present disclosure is generally related to mobile communications and, more particularly, to determination of type-1 hybrid automatic repeat request-acknowledgement (HARQ-ACK) codebook in physical uplink control channel (PUCCH) for secondary cell (SCell) dormancy.

BACKGROUND

Unless otherwise indicated herein, approaches described in this section are not prior art to the claims listed below and are not admitted as prior art by inclusion in this section.

Wireless communication technologies have grown exponentially over the years. A Long-Term Evolution (LTE) system offers high peak data rates, low latency, improved system capacity, and low operating cost resulting from simplified network architecture. LTE systems, also known as the $4^{th}$ Generation (4G) networks, also provide seamless integration to legacy wireless networks, such as Global System for Mobile communications (GSM) networks, Code-Division Multiple Access (CDMA) networks, and Universal Mobile Telecommunication System (UMTS) networks. In LTE systems, an Evolved Universal Terrestrial Radio Access Network (E-UTRAN) generally includes a plurality of evolved Node-Bs (eNodeBs or eNBs) communicating with a plurality of mobile stations (also referred to as user equipment (UEs)). The $3^{rd}$ Generation Partner Project (3GPP) network normally includes a hybrid of 2G/3G/4G systems. The next generation mobile network (NGMN) board has decided to focus the future NGMN activities on defining the end-to-end requirements for $5^{th}$ Generation (5G) New Radio (NR) systems.

In 4G LTE, a feature called carrier aggregation (CA) is supported to allow communications between a UE and a base station (BS) (e.g., an eNB) on multiple aggregated carriers or cells (e.g., a primary cell (PCell) and one or more secondary cells (SCells)). The design of SCell is to provide more data bandwidth in other carrier frequencies, typically higher frequencies, for boosting up data throughput while the PCell is more for ensuring the coverage. Later, in 3GPP Release 15 for enhancing LTE CA Utilization (euCA), a new SCell state, called dormant SCell state, is introduced so that SCells can become inactive for power saving when the data transmission requirement is not high.

In 5G NR, the dormancy behavior is further implemented at bandwidth part (BWP) level. The BWP that supports dormancy behavior for an SCell is referred to as a dormant BWP, where physical downlink control channel (PDCCH) monitoring occasion is not configured. When compared to LTE, the transition between dormancy behavior and non-dormancy behavior is based on BWP switching, which may effectively reduce the switch delay and UE power consumption. However, the current 5G NR framework of determination of type-1 hybrid automatic repeat request-acknowledgement (HARQ-ACK) codebook in physical uplink control channel (PUCCH) is not suitable for SCell dormancy.

Accordingly, how to determine the type-1 HARQ-ACK codebook in PUCCH for SCell dormancy has become an important issue in 5G NR. Therefore, there is a need to provide proper schemes to solve this issue.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to determination of type-1 HARQ-ACK codebook in PUCCH for SCell dormancy.

In one aspect, a method may involve an apparatus (e.g., a UE) determining that an active downlink (DL) BWP for a serving cell of the apparatus is a dormant BWP. The method may also involve the apparatus determining K1 values associated with an active uplink (UL) BWP for the serving cell according to a set of slot timing values comprising integer multiples of 1. The method may further involve the apparatus applying the K1 values for determination of a type-1 hybrid automatic repeat request-acknowledgement (HARQ-ACK) codebook in a PUCCH.

In one aspect, a method may involve an apparatus (e.g., a network node) determining that an active DL BWP for a serving cell of a UE is a dormant BWP. The method may also involve the apparatus determining K1 values associated with an active UL BWP for the serving cell according to a set of slot timing values comprising integer multiples of 1. The method may further involve the apparatus applying the K1 values for decoding a type-1 HARQ-ACK codebook in a PUCCH.

In one aspect, an apparatus (e.g., a UE) may comprise a transceiver which, during operation, wirelessly communicates with a network node of a wireless network. The apparatus may also comprise a processor communicatively coupled to the transceiver. The processor, during operation, may perform operations comprising determining that an active DL BWP for a serving cell of the apparatus is a dormant BWP. The processor may also perform operations comprising determining K1 values associated with an active UL BWP for the serving cell according to a set of slot timing values comprising integer multiples of 1. The processor may further perform operations comprising applying the K1 values for determination of a type-1 HARQ-ACK codebook in a PUCCH.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), Industrial Internet of Things (IIoT), beyond 5G (B5G), and 6th Generation (6G), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to determination of type-1 HARQ-ACK codebook in PUCCH for SCell dormancy. According to the present disclosure, a number of possible solutions may be implemented separately or jointly. That is, although these possible solutions may be described below separately, two or more of these possible solutions may be implemented in one combination or another.

In 4G LTE or 5G NR, HARQ-ACK information transmission is introduced to improve transmission reliability and robustness. A user equipment (UE) needs to report HARQ-ACK information for corresponding downlink receptions in a HARQ-ACK codebook to a network node. The HARQ-ACK codebook may be transmitted in a slot indicated by a value of a HARQ feedback timing indicator field in a corresponding downlink control information (DCI) format. The DCI format may also indicate the physical uplink control channel (PUCCH) resource scheduled for the HARQ-ACK information transmission. HARQ-ACK multiplexing can be used to facilitate HARQ-ACK information transmission. Multiple HARQ-ACK feedbacks corresponding to multiple physical downlink shared channel (PDSCH) transmissions may be accumulated, multiplexed and transmitted to the network node at once. One PUCCH resource may be used to carry multiple HARQ-ACK feedbacks to be transmitted in the same slot.

There are three types of HARQ-ACK codebooks, including type-1 HARQ-ACK codebook, type-2 HARQ-ACK codebook, and type-3 HARQ-ACK codebook, defined in current 5G NR framework. Type-1 HARQ-ACK codebook is a semi-static codebook, and the number of bits to send in an ACK/NACK report is fixed and could be potentially large. Type-2 HARQ-ACK codebook is a dynamic codebook with which the UE sends HARQ feedbacks only for the scheduled carriers. Type-3 HARQ-ACK codebook is introduced in 3GPP Release 16 for use of the HARQ-ACK codebook retransmission and is applicable for one-shot feedback. According to 3GPP technical specification (TS) 38.213, V16.10.0, when determining the K1 values for type-1 HARQ-ACK codebook, it is assumed that the UE would monitor at least one of DCI formats 1_0, 1_1, and 1_2. However, when an SCell enters the dormant state, the UE stops PDCCH monitoring (i.e., the UE does not monitor any of DCI formats 1_0, 1_1, and 1_2), and it will be unclear which set of K1 values the UE should assume.

In view of the above, the present disclosure proposes a number of schemes pertaining to determination of type-1 HARQ-ACK codebook in PUCCH for SCell dormancy. According to the schemes of the present disclosure, when an SCell switches to the dormant BWP, the K1 values for determination/decoding of type-1 HARQ-ACK codebook is provided by a specific set of slot timing values with integer multiples of 1 (e.g., $\{1, 2, 3, 4, 5, 6, 7, 8\}$). Accordingly, by applying the schemes of the present disclosure, the UE and the network node can be synchronized with respect to applying proper K1 values for determination of type-1 HARQ-ACK codebook.

Figure 1:
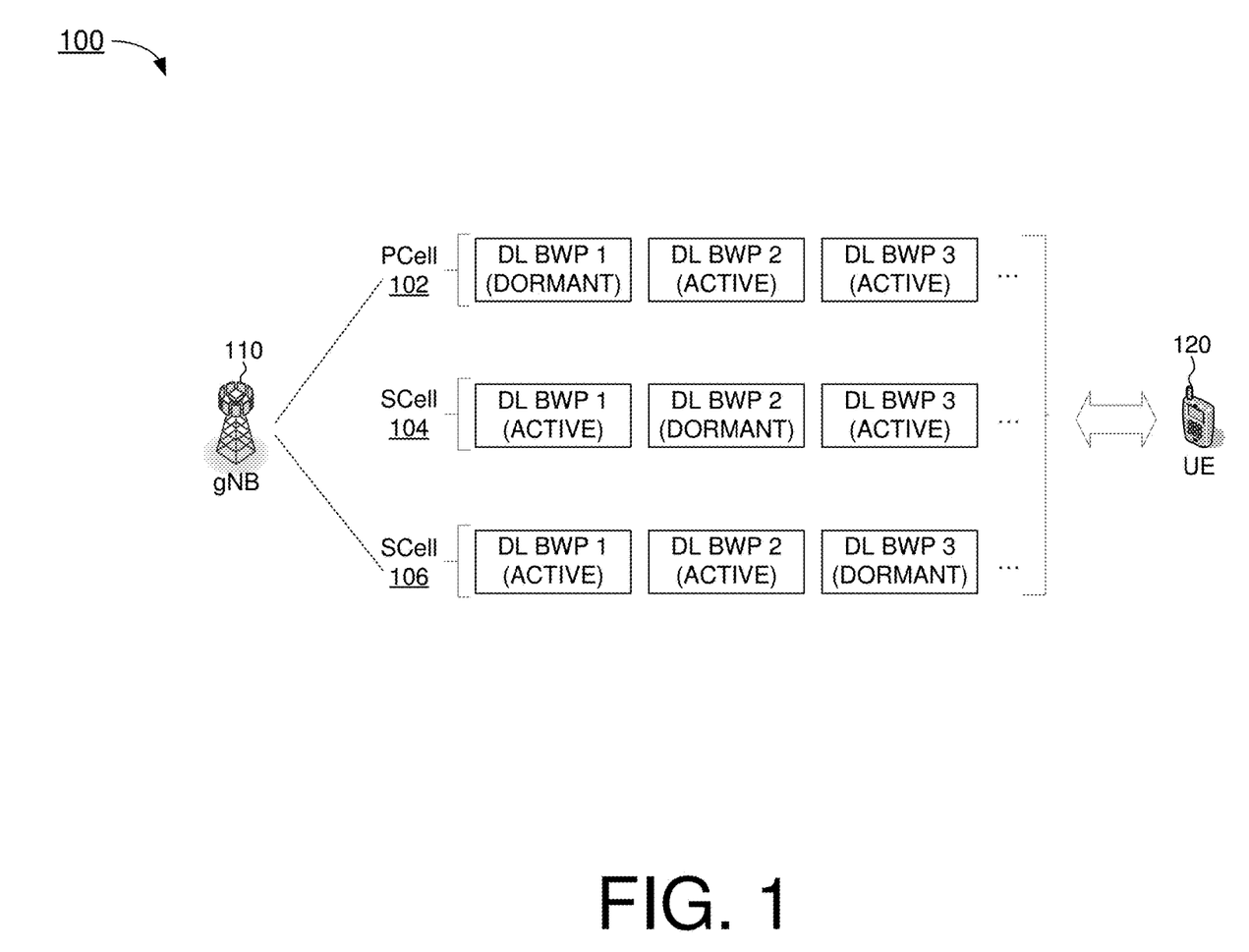
FIG. 1 is a diagram depicting an example scenario of BWP configuration for communications between a network node and a UE in accordance with implementations of the present disclosure.

FIG. 1 illustrates an example scenario 100 of BWP configuration for communications between a network node and a UE in accordance with implementations of the present disclosure. As shown in FIG. 1, the gNB 110 may communicate (e.g., DL communication) with the UE 120 on multiple serving cells by carrier aggregation, and the multiple serving cells may include a PCell 102 and one or more SCells, such as an SCell 104, and an SCell 106. For each serving cell, a plurality of DL BWPs may be configured, wherein only one DL BWP is dormant, while the other DL BWPs are active (i.e., non-dormant). More specifically, a BWP that supports dormancy behavior for an SCell is referred to as a dormant BWP, where PDCCH monitoring occasion is not configured. That is, the UE 120 is not required to perform PDCCH monitoring on the dormant BWP. For example, the UE 120 may be configured to switch in or out of a dormant BWP in an SCell, e.g., according to a DCI with SCell dormancy indication provided by the gNB 110.

Figure 2:
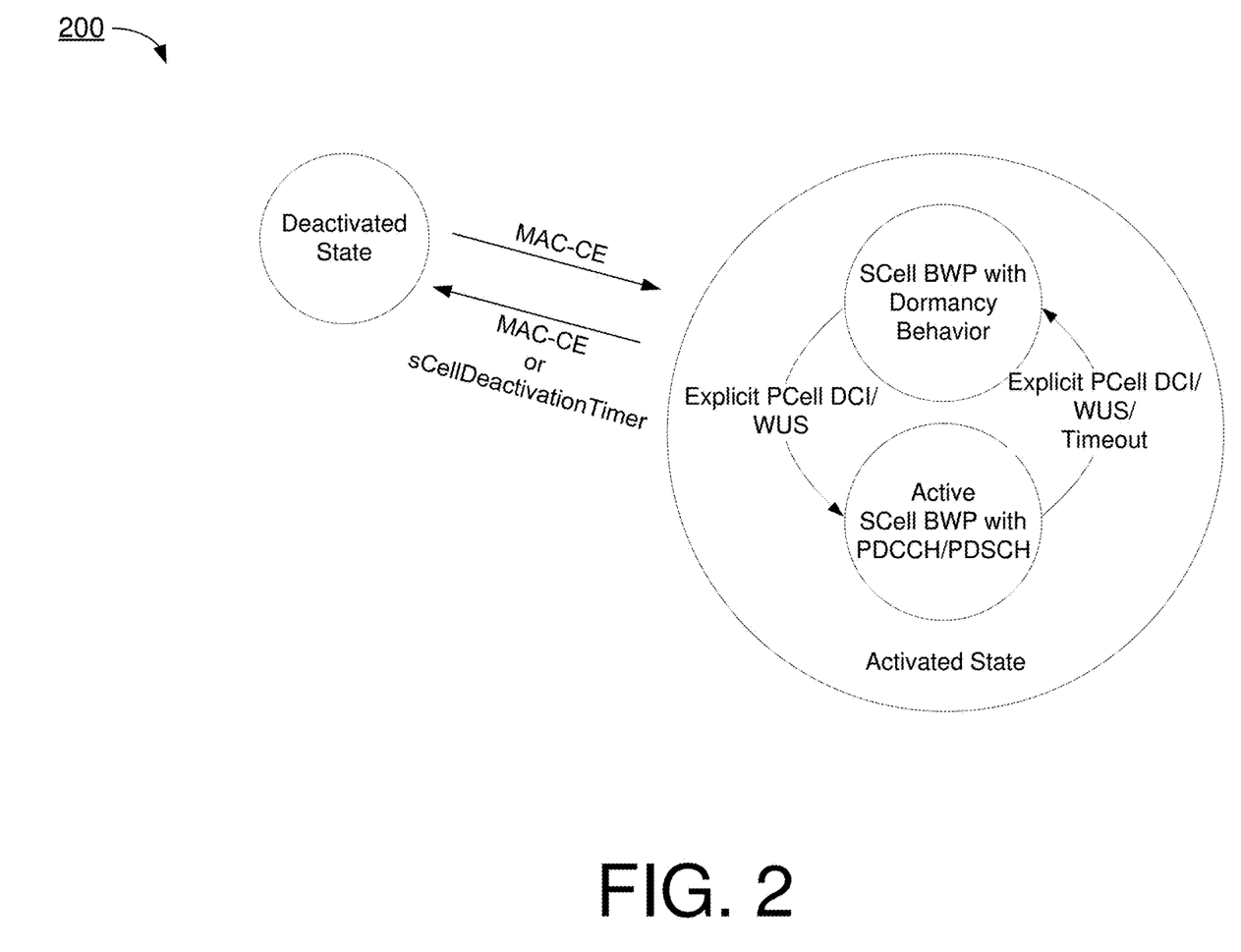
FIG. 2 is a diagram depicting an example scenario of a state diagram for BWP switching in an SCell in accordance with implementations of the present disclosure.

FIG. 2 illustrates an example scenario 200 of a state diagram for BWP switching in an SCell in accordance with implementations of the present disclosure. For a UE, an SCell may be activated or deactivated by medium access control-control element (MAC-CE) or a deactivation timer. When the SCell is in the activated state, the UE may switch the SCell from an active BWP to the dormant BWP after receiving a DCI with SCell dormancy indication (i.e., indicating the UE to switch the SCell to the dormant BWP), or after receiving a wake-up signal (WUS), or after an inactivity timer expires. Later, when the UE decides to continue communicating with the gNB in the SCell (e.g., based on receiving a DCI with BWP switching indication), the UE may switch the SCell from the dormant BWP to an active BWP for communicating with the gNB. More specifically, the dormancy behavior implies that the UE stops PDCCH monitoring but continues other activities, such as channel state information (CSI) measurements, automatic gain control (AGC), and beam management. For a (DL) BWP with dormancy behavior, the pdcch-Config information element (IE) is not configured, and the UE determines, via radio resource control (RRC) configuration, which configured DL BWP is the dormant BWP. The dormant BWP is configured only when at least one "regular BWP" with IE pdcch-Config is configured. With respect to uplink (UL) behaviors when an SCell enters the dormant state, the UE may clear or suspend any UL grants (e.g., type 1, and type 2 UL grants) associated with the SCell, and not perform any random access channel (RACH) procedure. Furthermore, aperiodic CSI or sounding reference signal (SRS) via self-carrier scheduling is not allowed, and aperiodic CSI via cross-carrier scheduling is not allowed. As the dormant state in LTE euCA, SCell dormancy in 5G NR is not applicable to the PUCCH SCell as well.

Illustrative Implementations

Figure 3:
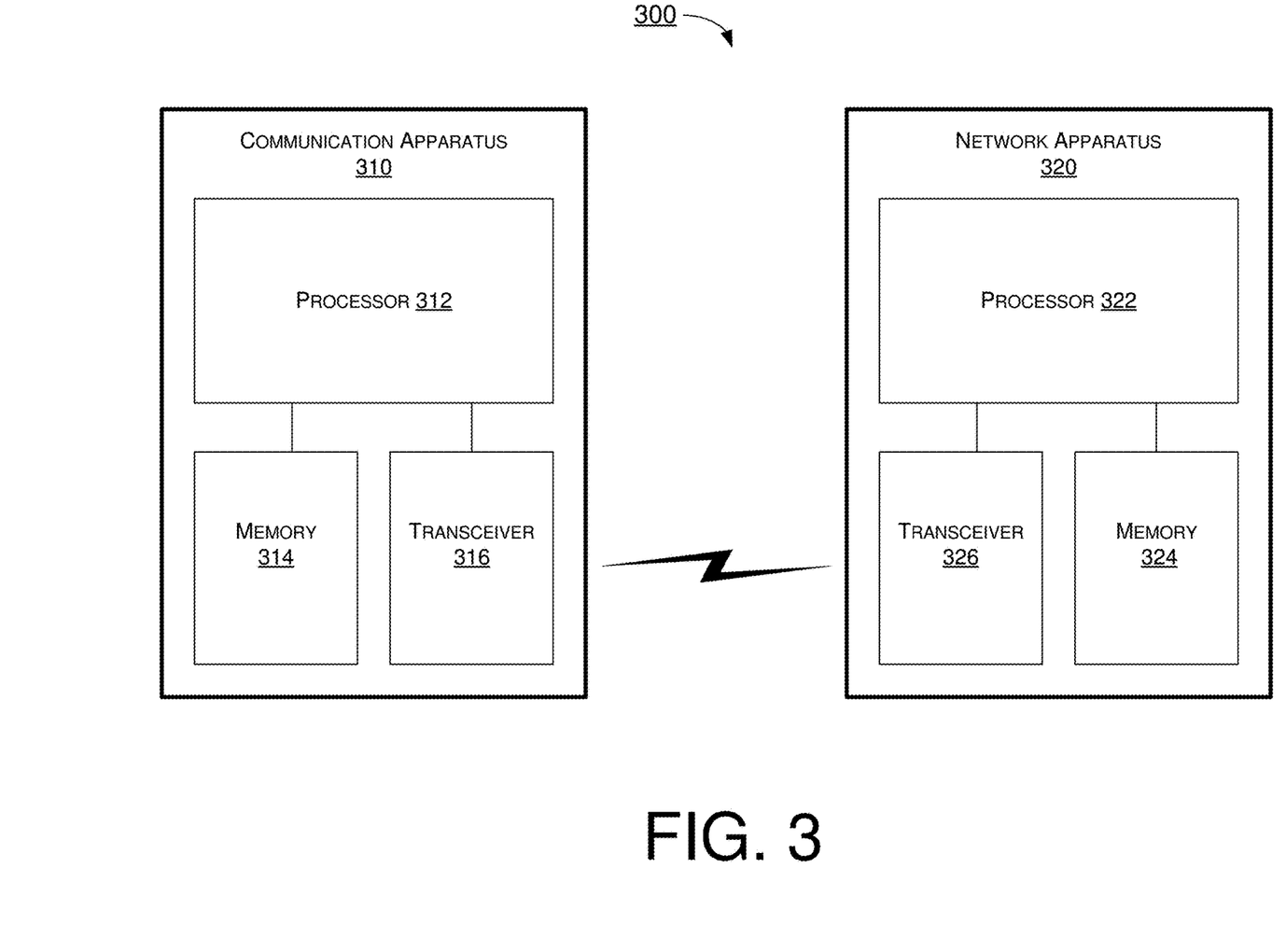
FIG. 3 is a block diagram of an example communication system in accordance with an implementation of the present disclosure.

FIG. 3 illustrates an example communication system 300 having an example communication apparatus 310 and an example network apparatus 320 in accordance with an implementation of the present disclosure. Each of communication apparatus 310 and network apparatus 320 may perform various functions to implement schemes, techniques, processes and methods described herein pertaining to determination of type-1 HARQ-ACK codebook in PUCCH for SCell dormancy, including scenarios/schemes described above as well as process 400 and process 500 described below.

Communication apparatus 310 may be a part of an electronic apparatus, which may be a UE such as a portable or mobile apparatus, a wearable apparatus, a wireless communication apparatus or a computing apparatus. For instance, communication apparatus 310 may be implemented in a smartphone, a smartwatch, a personal digital assistant, a digital camera, or a computing equipment such as a tablet computer, a laptop computer or a notebook computer. Communication apparatus 310 may also be a part of a machine type apparatus, which may be an IoT, NB-IoT, or IIoT apparatus such as an immobile or a stationary apparatus, a home apparatus, a wire communication apparatus or a computing apparatus. For instance, communication apparatus 310 may be implemented in a smart thermostat, a smart fridge, a smart door lock, a wireless speaker or a home control center. Alternatively, communication apparatus 310 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 310 may include at least some of those components shown in FIG. 3 such as a processor 312, for example. Communication apparatus 310 may further include one or more other components not pertinent to the proposed scheme of the present disclosure (e.g., internal power supply, display device and/or user interface device), and, thus, such component(s) of communication apparatus 310 are neither shown in FIG. 3 nor described below in the interest of simplicity and brevity.

Network apparatus 320 may be a part of a network apparatus, which may be a network node such as a satellite, a BS, a small cell, a router or a gateway. For instance, network apparatus 320 may be implemented in an eNodeB in an LTE network, in a next generation NodeB (gNB) or a transmission and reception point (TRP) in 5G NR, IoT, NB-IoT or IIoT network or in a satellite or base station in a 6G network. Alternatively, network apparatus 320 may be implemented in the form of one or more IC chips such as, for example and without limitation, one or more single-core processors, one or more multi-core processors, or one or more RISC or CISC processors. Network apparatus 320 may include at least some of those components shown in FIG. 3 such as a processor 322, for example. Network apparatus 320 may further include one or more other components not pertinent to the proposed scheme of the present disclosure (e.g., internal power supply, display device and/or user interface device), and, thus, such component(s) of network apparatus 320 are neither shown in FIG. 3 nor described below in the interest of simplicity and brevity.

In one aspect, each of processor 312 and processor 322 may be implemented in the form of one or more single-core processors, one or more multi-core processors, or one or more CISC processors. That is, even though a singular term "a processor" is used herein to refer to processor 312 and processor 322, each of processor 312 and processor 322 may include multiple processors in some implementations and a single processor in other implementations in accordance with the present disclosure. In another aspect, each of processor 312 and processor 322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 312 and processor 322 is a special-purpose machine specifically designed, arranged and configured to perform specific tasks including determination of type-1 HARQ-ACK codebook in PUCCH for SCell dormancy in a UE (e.g., as represented by communication apparatus 310) and a network node (e.g., as represented by network apparatus 320) in accordance with various implementations of the present disclosure.

In some implementations, communication apparatus 310 may also include a transceiver 316 coupled to processor 312 and capable of wirelessly transmitting and receiving data. In some implementations, transceiver 316 may be capable of wirelessly communicating with different types of wireless networks of different radio access technologies (RATs). In some implementations, transceiver 316 may be equipped with a plurality of antenna ports (not shown) such as, for example, four antenna ports. That is, transceiver 316 may be equipped with multiple transmit antennas and multiple receive antennas for multiple-input multiple-output (MIMO) wireless communications. In some implementations, network apparatus 320 may also include a transceiver 326 coupled to processor 322 and capable of wirelessly transmitting and receiving data. In some implementations, transceiver 326 may be capable of wirelessly communicating with different types of UEs of different RATs. In some implementations, transceiver 326 may be equipped with a plurality of antenna ports (not shown) such as, for example, four antenna ports. That is, transceiver 326 may be equipped with multiple transmit antennas and multiple receive antennas for MIMO wireless communications.

In some implementations, communication apparatus 310 may further include a memory 314 coupled to processor 312 and capable of being accessed by processor 312 and storing data therein. In some implementations, network apparatus 320 may further include a memory 324 coupled to processor 322 and capable of being accessed by processor 322 and storing data therein. Each of memory 314 and memory 324 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 314 and memory 324 may include a type of read-only memory (ROM) such as mask ROM, programmable ROM (PROM), erasable programmable ROM (EPROM) and/or electrically erasable programmable ROM (EEPROM). Alternatively, or additionally, each of memory 314 and memory 324 may include a type of non-volatile random-access memory (NVRAM) such as flash memory, solid-state memory, ferroelectric RAM (FeRAM), magnetoresistive RAM (MRAM) and/or phase-change memory.

Each of communication apparatus 310 and network apparatus 320 may be a communication entity capable of communicating with each other using various proposed schemes in accordance with the present disclosure. For illustrative purposes and without limitation, a description of capabilities of communication apparatus 310, as a UE, and network apparatus 320, as a network node, is provided below.

Under certain proposed schemes in accordance with the present disclosure with respect to determination of type-1 HARQ-ACK codebook in PUCCH for SCell dormancy, processor 312 of communication apparatus 310, implemented in or as a UE, may determine that an active DL BWP for a serving cell of communication apparatus 310 is a dormant BWP. Moreover, processor 312 may determine K1 values associated with an active UL BWP for the serving cell according to a set of slot timing values including integer multiples of 1. Accordingly, processor 312 may apply the K1 values for determination of a type-1 HARQ-ACK codebook in a PUCCH. Likewise, from the aspect of network apparatus 320, implemented in or as a network node, processor 322 may determine that an active DL BWP for a serving cell of communication apparatus 310 is a dormant BWP, and determine K1 values associated with an active UL BWP for the serving cell according to a set of slot timing values comprising integer multiples of 1. Accordingly, processor 322 may apply the K1 values for decoding a type-1 HARQ-ACK codebook in a PUCCH.

In some implementations, the set of slot timing values may include 1, 2, 3, 4, 5, 6, 7, and 8.

In some implementations, processor 312 may also receive, via transceiver 316, a PDSCH in the serving cell. More specifically, the type-1 HARQ-ACK codebook is corresponding to the PDSCH reception. Additionally, processor 312 may transmit, via transceiver 316, the type-1 HARQ-ACK codebook in the PUCCH to a network node.

In some implementations, processor 312 may also stop PDCCH monitoring in the serving cell in response to the active DL BWP for the serving cell being the dormant BWP.

In some implementations, stopping PDCCH monitoring in the serving cell may include stopping monitoring any of DCI formats 1_0, 1_1, and 1_2 in the serving cell.

Illustrative Processes

Figure 4:
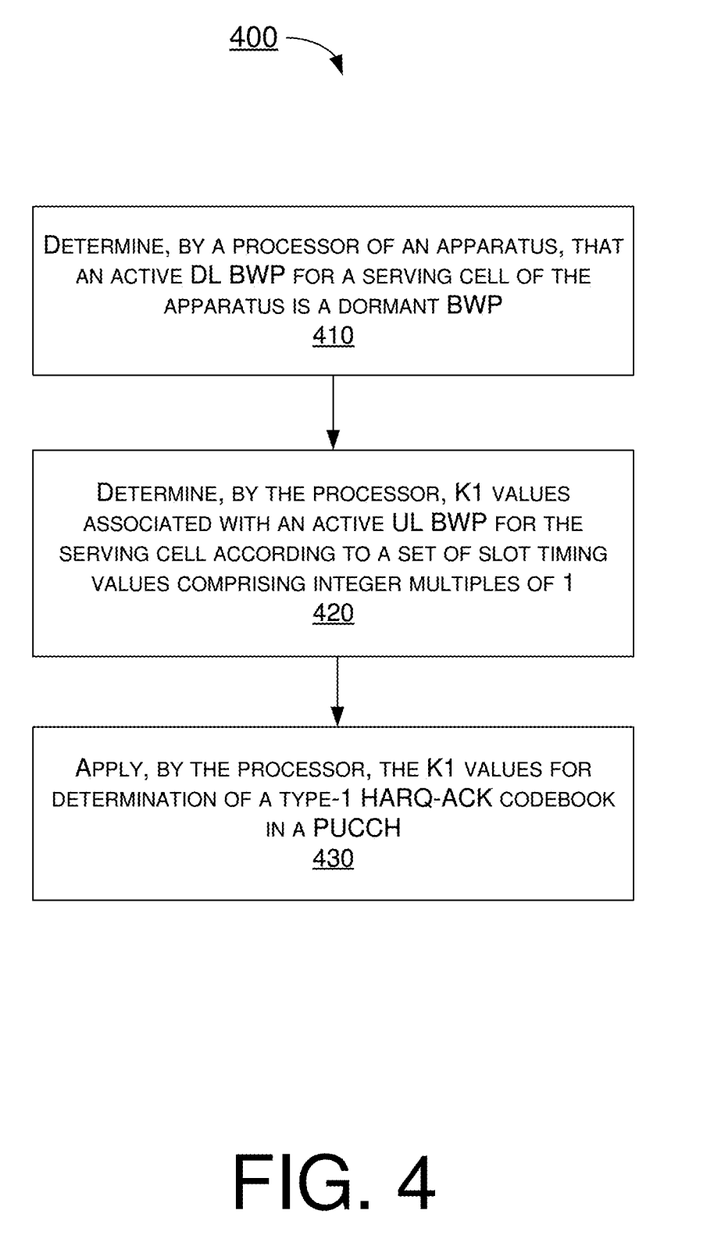
FIG. 4 is a flowchart of an example process in accordance with an implementation of the present disclosure.

FIG. 4 illustrates an example process 400 in accordance with an implementation of the present disclosure. Process 400 may be an example implementation of above scenarios/schemes, whether partially or completely, with respect to determination of type-1 HARQ-ACK codebook in PUCCH for SCell dormancy. Process 400 may represent an aspect of implementation of features of communication apparatus 310. Process 400 may include one or more operations, actions, or functions as illustrated by one or more of blocks 410, 420, and 430. Although illustrated as discrete blocks, various blocks of process 400 may be divided into additional blocks, combined into fewer blocks, or eliminated, depending on the desired implementation. Moreover, the blocks of process 400 may be executed in the order shown in FIG. 4 or, alternatively, in a different order. Process 400 may be implemented by communication apparatus 310 or any suitable UE or machine type devices. Solely for illustrative purposes and without limitation, process 400 is described below in the context of communication apparatus 310. Process 400 may begin at block 410.

At 410, process 400 may involve processor 312 of communication apparatus 310 determining that an active DL BWP for a serving cell of communication apparatus 310 is a dormant BWP. Process 400 may proceed from 410 to 420.

At 420, process 400 may involve processor 312 determining K1 values associated with an active UL BWP for the serving cell according to a set of slot timing values including integer multiples of 1. Process 400 may proceed from 420 to 430.

At 430, process 400 may involve processor 312 applying the K1 values for determination of a type-1 HARQ-ACK codebook in a PUCCH.

In some implementations, the set of slot timing values may include 1, 2, 3, 4, 5, 6, 7, and 8.

In some implementations, process 400 may further involve processor 312 receiving, via transceiver 316, a PDSCH in the serving cell. More specifically, the type-1 HARQ-ACK codebook is corresponding to the PDSCH reception. Additionally, process 400 may further involve processor 312 transmitting, via transceiver 316, the type-1 HARQ-ACK codebook in the PUCCH to a network node.

In some implementations, process 400 may further involve processor 312 stopping PDCCH monitoring in the serving cell in response to the active DL BWP for the serving cell being the dormant BWP.

In some implementations, stopping PDCCH monitoring in the serving cell may include stopping monitoring any of DCI formats 1_0, 1_1, and 1_2 in the serving cell.

Figure 5:
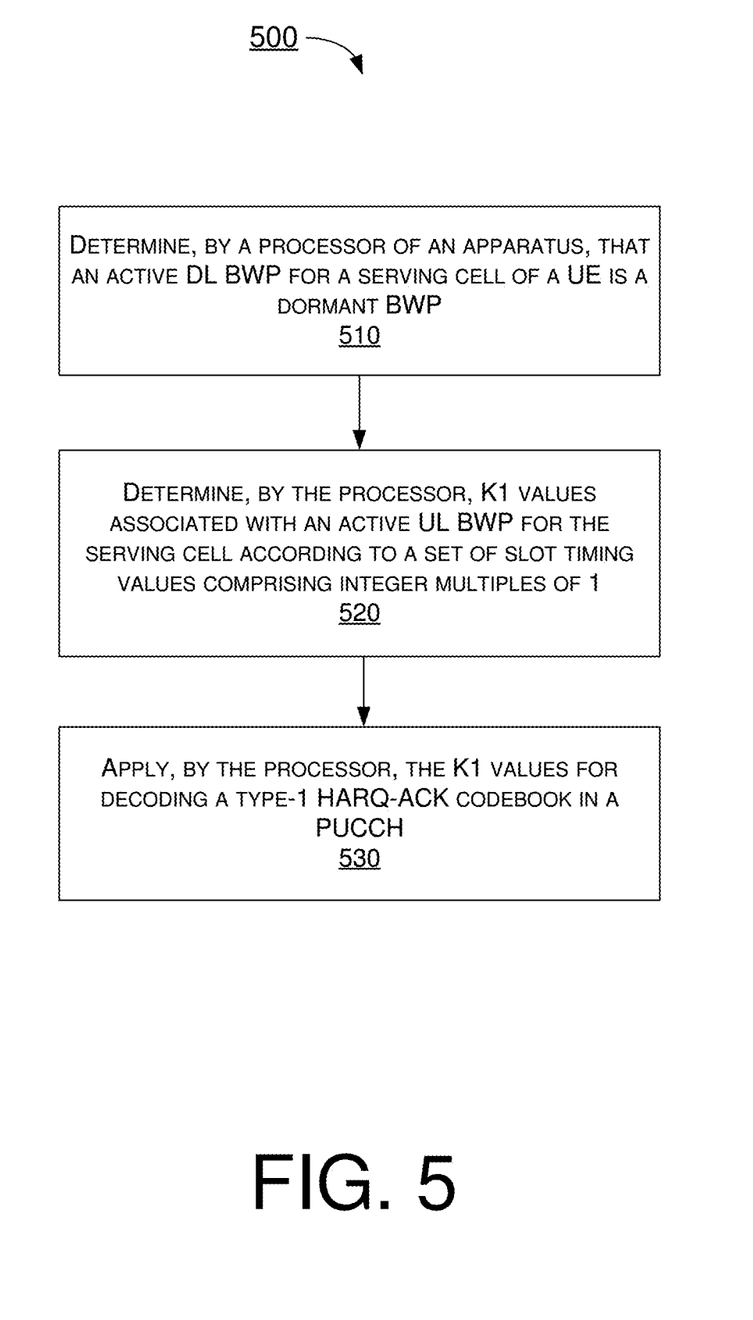
FIG. 5 is a flowchart of an example process in accordance with an implementation of the present disclosure.

FIG. 5 illustrates an example process 500 in accordance with an implementation of the present disclosure. Process 500 may be an example implementation of above scenarios/schemes, whether partially or completely, with respect to determination of type-1 HARQ-ACK codebook in PUCCH for SCell dormancy. Process 500 may represent an aspect of implementation of features of network apparatus 320. Process 500 may include one or more operations, actions, or functions as illustrated by one or more of blocks 510, 520, and 530. Although illustrated as discrete blocks, various blocks of process 500 may be divided into additional blocks, combined into fewer blocks, or eliminated, depending on the desired implementation. Moreover, the blocks of process 500 may be executed in the order shown in FIG. 5 or, alternatively, in a different order. Process 500 may be implemented by network apparatus 320 or any base stations or network nodes. Solely for illustrative purposes and without limitation, process 500 is described below in the context of network apparatus 320. Process 500 may begin at block 510.

At 510, process 500 may involve processor 322 of network apparatus 320 determining that an active DL BWP for a serving cell of communication apparatus 310 is a dormant BWP. Process 500 may proceed from 510 to 520.

At 520, process 500 may involve processor 322 determining K1 values associated with an active UL BWP for the serving cell according to a set of slot timing values including integer multiples of 1. Process 500 may proceed from 520 to 530.

At 530, process 500 may involve processor 322 applying the K1 values for decoding a type-1 HARQ-ACK codebook in a PUCCH.

In some implementations, the set of slot timing values may include 1, 2, 3, 4, 5, 6, 7, and 8.

In some implementations, process 500 may further involve processor 322 transmitting, via transceiver 326, a PDSCH in the serving cell to communication apparatus 310. More specifically, the type-1 HARQ-ACK codebook is corresponding to the PDSCH reception at communication apparatus 310. Additionally, process 500 may further involve processor 322 receiving, via transceiver 326, the type-1 HARQ-ACK codebook in the PUCCH from communication apparatus 310.

In some implementations, process 500 may further involve processor 322 stopping PDCCH transmission in the serving cell in response to the active DL BWP for the serving cell being the dormant BWP.

In some implementations, stopping PDCCH transmission in the serving cell may include stopping transmission of any of DCI formats 1_0, 1_1, and 1_2 in the serving cell.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    determining, by a processor of an apparatus, that an active downlink (DL) bandwidth part (BWP) for a serving cell of the apparatus is a dormant BWP;
    stopping, by the processor, physical downlink control channel (PDCCH) monitoring for any of downlink control information (DCI) formats 1_0, 1_1, and 1_2 in the serving cell in response to the active DL BWP for the serving cell being the dormant BWP:

determining, by the processor, K1 values associated with an active uplink (UL) BWP for the serving cell according to a set of slot timing values comprising integer multiples of 1, in an event that the PDCCH monitoring for any of the DCI formats 1_0, 1_1, and 1_2 in the serving cell is stopped; and applying, by the processor, the K1 values for determination of a type-1 hybrid automatic repeat request-acknowledgement (HARQ-ACK) codebook in a physical uplink control channel (PUCCH).

2. The method of claim 1, wherein the set of slot timing values comprise 1, 2, 3, 4, 5, 6, 7, and 8.

3. The method of claim 1, further comprising:
receiving, by the processor, a physical downlink shared channel (PDSCH) in the serving cell, wherein the type-1 HARQ-ACK codebook is corresponding to the PDSCH reception; and
transmitting, by the processor, the type-1 HARQ-ACK codebook in the PUCCH to a network node.

4. A method, comprising:
determining, by a processor of an apparatus, that an active downlink (DL) bandwidth part (BWP) for a serving cell of a user equipment (UE) is a dormant BWP;
stopping, by the processor, physical downlink control channel (PDCCH) transmission in the serving cell in response to the active DL BWP for the serving cell being the dormant BWP;
determining, by the processor, K1 values associated with an active uplink (UL) BWP for the serving cell according to a set of slot timing values comprising integer multiples of 1, in an event that the PDCCH monitoring for any of the DCI formats 1_0, 1_1, and 1_2 in the serving cell is stopped; and
applying, by the processor, the K1 values for decoding a type-1 hybrid automatic repeat request-acknowledgement (HARQ-ACK) codebook in a physical uplink control channel (PUCCH).

5. The method of claim 4, wherein the set of slot timing values comprise 1, 2, 3, 4, 5, 6, 7, and 8.

6. The method of claim 4, further comprising:
transmitting, by the processor, a physical downlink shared channel (PDSCH) in the serving cell to the UE, wherein the type-1 HARQ-ACK codebook is corresponding to the PDSCH reception at the UE; and
receiving, by the processor, the type-1 HARQ-ACK codebook in the PUCCH from the UE.

7. An apparatus, comprising:
a transceiver which, during operation, wirelessly communicates with a network node of a wireless network; and
a processor communicatively coupled to the transceiver such that, during operation, the processor performs operations comprising:
determining that an active downlink (DL) bandwidth part (BWP) for a serving cell of the apparatus is a dormant BWP;
stopping, via the transceiver, physical downlink control channel (PDCCH) monitoring in the serving cell in response to the active DL BWP for the serving cell being the dormant BWP;
determining K1 values associated with an active uplink (UL) BWP for the serving cell according to a set of slot timing values comprising integer multiples of 1, in an event that the PDCCH monitoring for any of the DCI formats 1_0, 1_1, and 1_2 in the serving cell is stopped; and
applying the K1 values for determination of a type-1 hybrid automatic repeat request-acknowledgement (HARQ-ACK) codebook in a physical uplink control channel (PUCCH).

8. The apparatus of claim 7, wherein the set of slot timing values comprise 1, 2, 3, 4, 5, 6, 7, and 8.

9. The apparatus of claim 7, wherein, during operation, the processor further performs operations comprising:
receiving, via the transceiver, a physical downlink shared channel (PDSCH) in the serving cell, wherein the type-1 HARQ-ACK codebook is corresponding to the PDSCH reception; and
transmitting, via the transceiver, the type-1 HARQ-ACK codebook in the PUCCH to the network node.

* * * * *